(12) United States Patent
Matiossian

(10) Patent No.: US 12,425,718 B2
(45) Date of Patent: Sep. 23, 2025

(54) METHODS AND SYSTEMS FOR DISPLAYING AND RECORDING MULTIPLE VIDEO FEEDS USING A SINGLE, UNIFIED WINDOW

(71) Applicant: DUBL, INC., Highlands Ranch, CO (US)

(72) Inventor: Arthur Matiossian, Los Angeles, CA (US)

(73) Assignee: DUBL, INC., Highlands Ranch, CO (US)

( * ) Notice: Subject to any disclaimer, the term of this patent is extended or adjusted under 35 U.S.C. 154(b) by 0 days.

(21) Appl. No.: 18/673,587

(22) Filed: May 24, 2024

(65) Prior Publication Data

US 2024/0397195 A1 Nov. 28, 2024

Related U.S. Application Data

(63) Continuation of application No. 18/177,428, filed on Mar. 2, 2023, now Pat. No. 11,997,380, which is a continuation of application No. 16/827,411, filed on Mar. 23, 2020, now Pat. No. 11,601,598.

(51) Int. Cl.
*H04N 23/63* (2023.01)
*G06F 3/04886* (2022.01)
*G06T 1/20* (2006.01)

(52) U.S. Cl.
CPC ....... *H04N 23/632* (2023.01); *G06F 3/04886* (2013.01); *G06T 1/20* (2013.01); *H04N 23/633* (2023.01)

(58) Field of Classification Search
CPC ....... H04N 5/232935; H04N 5/232939; H04N 5/23293; H04N 5/232933; H04N 5/2624; G06F 3/04886; G06F 2203/04803; G06T 1/20
See application file for complete search history.

(56) References Cited

U.S. PATENT DOCUMENTS

| | | | |
|---|---|---|---|
| 2014/0015781 A1* | 1/2014 | Lee | G06F 3/017 345/173 |
| 2016/0105406 A1* | 4/2016 | Smith | H04W 8/26 713/171 |
| 2017/0176208 A1* | 6/2017 | Chung | H04N 7/183 |
| 2017/0244879 A1* | 8/2017 | Bezjian | H04N 5/772 |
| 2018/0190253 A1* | 7/2018 | O'Driscoll | G06Q 50/01 |
| 2022/0159183 A1* | 5/2022 | Li | H04N 5/232933 |

* cited by examiner

*Primary Examiner* — Hung H Lam
(74) *Attorney, Agent, or Firm* — HAYNES AND BOONE, LLP

(57) ABSTRACT

A method of simultaneously displaying a first video feed, a second video feed, and a map overlay within a single window that is generated by a mobile application includes identifying, using the mobile application that is stored in a mobile device, the first video feed that is generated by a front-facing camera; identifying, using the mobile application, the second video feed that is generated by a rear-facing camera; generating, using the mobile application, the map overlay using location data of the mobile device; creating, using the mobile application and a GPU of the mobile device, the single window that includes the first video feed, the second video feed, and the map overlay; displaying, on UI and using the mobile application, the single window; recording, using the mobile application, the displayed single window; and storing the recording of the displayed single window as a single video file.

20 Claims, 7 Drawing Sheets

METHODS AND SYSTEMS FOR DISPLAYING AND RECORDING MULTIPLE VIDEO FEEDS USING A SINGLE, UNIFIED WINDOW

CROSS-REFERENCE TO RELATED APPLICATIONS

This application is a continuation of U.S. application Ser. No. 18/177,428, filed Mar. 2, 2023, which is a continuation of U.S. application Ser. No. 16/827,411, now U.S. Pat. No. 11,601,598, filed Mar. 23, 2020, the entire disclosures of which are hereby incorporated herein by reference.

BACKGROUND

Mobile devices generally store multiple mobile applications or "apps" that display windows on a screen of the mobile device. Application icons are displayed on the screen, and the user selects one of the application icons to display an app window on the screen. Conventionally, app windows are displayed sequentially on the screen instead of simultaneously. In some instances, two apps may be displayed simultaneously if the mobile device is capable of "split screen" functionality. But even with "split screen" functionality, a first app window associated with a first app is not displayed simultaneously with a second app window associated with a second app in a single window generated by one mobile application. It is common, however, for the user to need to access two app windows simultaneously within a single window, specifically when one of the apps is a map app, which indicates where the mobile device is and heading relative to a geographical map. In some instances, and when a mobile device does not allow for "split screen" functionality, a user may use two mobile devices in order to simultaneously view the first app window and the second app window. This is cumbersome and not ideal. In other instances, the user manually switches between the first app window and the second app window, such that when the first app is in the active state then the second app is in a suspended or background state and vice versa. This not only requires the user to instruct, via a finger swipe or other input, the mobile device to open the first app window and/or the second app window, but also may result in a delay in displayed information when one app is switched from the suspended state or background state to active state.

Moreover, user satisfaction with mobile apps is heavily dependent upon the responsiveness of the app. That is, when a mobile app is unresponsive or even has a slight delay, the user is less likely to use the mobile app. A slight delay of one second or less can cause customer dissatisfaction and decrease user retention. Similarly, an app that requires a large amount of power and reduces the battery life of the mobile device in which it is installed can result in user dissatisfaction and decrease user retention. As such, any improvements to a mobile app's responsiveness and reduction of power can improve user retention.

In some instances, a user will use a mobile app to record a video of his or her surroundings. Conventional mobile apps require an instruction to record before the mobile app starts recording. As it is often difficult to predict a record-worthy event and is it not feasible to record all events, the user often cannot instruct the mobile app to record quickly enough to capture the record-worth event. As such, the record-worthy event is not recorded or saved.

DETAILED DESCRIPTION

Figure 1:
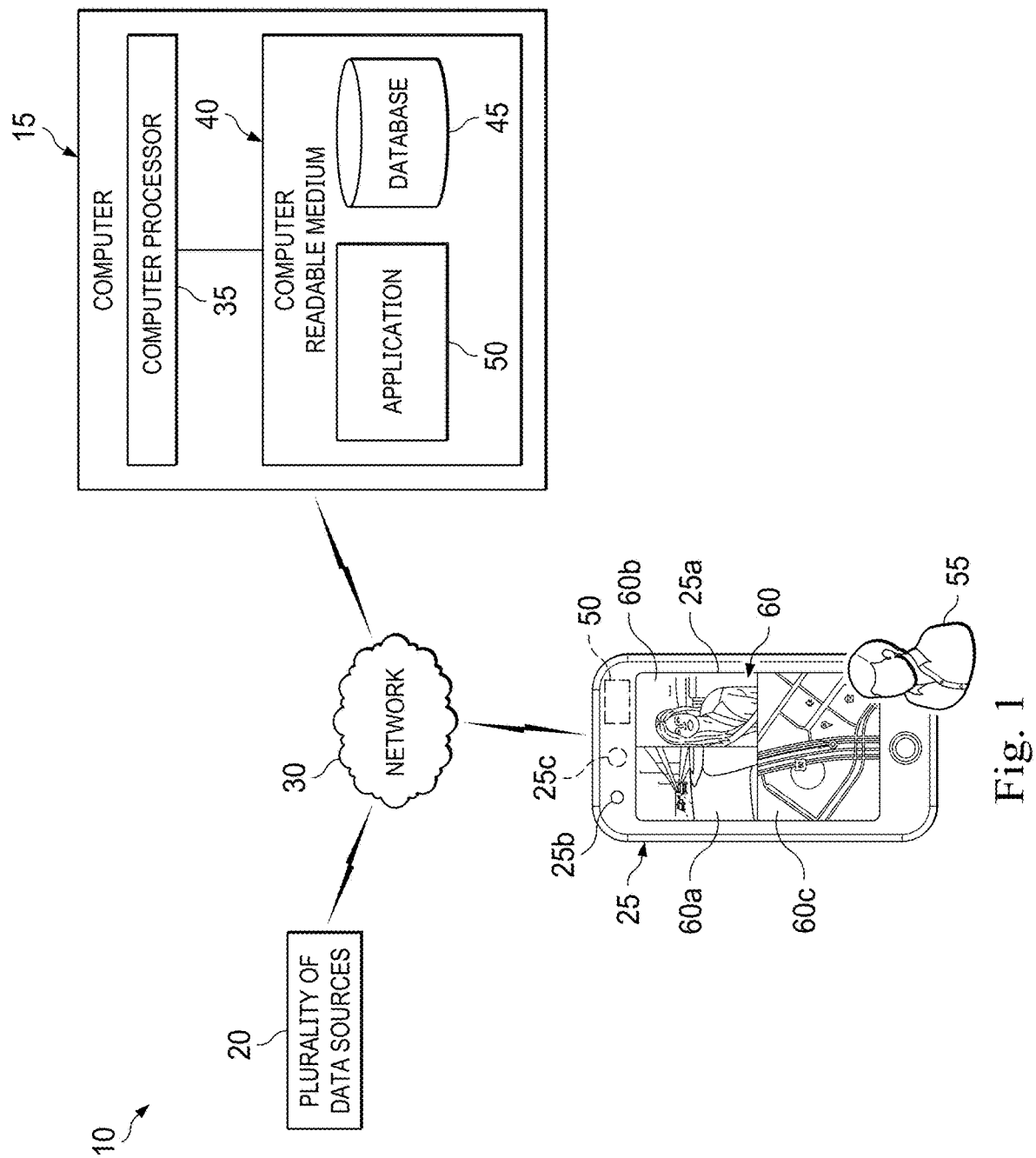
FIG. 1 is a diagrammatic illustration of a system that includes a mobile device upon which a mobile application is stored and a computer.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an example embodiment, referring to FIG. 1, an example embodiment of a system is illustrated and designated by the numeral 10. In an example embodiment, the system 10 includes a computer 15, a plurality of data sources 20, and one or more mobile devices 25, all of which are in communication via a network 30. In one or more example embodiments, the computer 15 includes a computer processor 35 and a computer readable medium 40 operably coupled thereto. Instructions accessible to, and executable by, the computer processor 35 are stored on the computer readable medium 40. A database 45 is also stored in the computer readable medium 40. In one or more example embodiments, the system 10 also includes an application 50 stored in the mobile device 25 and/or the computer 15. Generally, the mobile device 25 includes a user interface ("UI") 25*a*, a first camera 25*b*, and a second camera 25*c*. In some embodiments, the first camera 25*b* is a front-facing camera and the second camera 25*c* is a rear-facing camera. A user 55 views a window 60 displayed by the application 50 on the UI 25*a* of the mobile device 25. When the application 50 is "open" or in an active state on the mobile device 25, the window 60 includes three different sections with a first section 60*a* displaying a video feed of the first camera 25*b*, a second section 60*b* displaying a video feed of the second camera 25*c*, and an optional third section 60*c* that may display a map overlay.

Generally, the application 50 expands the functionality of the mobile device 25 by stitching together into a single window 60 the feeds of the first and second cameras as well as the map overlay. As noted above, mobile apps are conventionally displayed sequentially on the UI instead of simultaneously. That is, and with conventional systems, one application is a foreground application and the remainder of the applications are not foreground applications. In some instances, two apps may be displayed simultaneously if the mobile device is capable of "split screen" functionality. But even with "split screen" functionality, a first app window associated with a first app is not displayed simultaneously—in a single window—with a second app window associated with a second app. It is common, however, for the user to need to access two app windows simultaneously within a single window, specifically when one of the apps is a map app, which indicates where the mobile device is and heading relative to a geographical map, and when one of the other apps is a camera, which records footage of the surroundings. In some instances, and when a mobile device does not allow for "split screen" functionality, a user may use two mobile devices in order to view, simultaneously, the first app window and the second app window. This is cumbersome and not ideal. In other instances, and when a mobile device does not allow for "split screen" functionality, the user manually switches between the first app window and the second app window, which requires the user to instruct, via a finger swipe or other input, the mobile device to open the first app window and/or the second app window. As noted above, this switching between applications can result in a delay to the display of updated information. Here, using the application 50, the sections 60a-60c display content that would conventionally be displayed using at least two different mobile apps. As the display of content is consolidated into one window or single frame, the need to switch between mobile apps or carry two mobile phones is eliminated. The elimination of the switching between mobile apps improves the functioning of the mobile device 25 in that the processing load associated with changing an application from the active state to the background state or suspended state and changing an application having a background state or suspended state to the foreground application is eliminated. Instead, the application 50 remains as the foreground application while displaying content conventionally displayed using at least two different apps (e.g., Camera Roll and a map app). Allowing the application 50 to remain in the foreground also allows for the data to be updated continuously instead of being updated upon switching from the background or suspended state to the active state. Not only does the application 50 expand the functionality of the mobile device 25 for the reasons noted above, the application 50 also solves the problems with conventional systems that are noted above.

Moreover, the application 50 creates a video file that includes a unified window or frame that stitches together the three sections 60a, 60b, and 60c. In some embodiments, the video file is created upon the user 55 initiating a recording via selecting a "record stop/start" button, but in some instances the video is initiated and created in response to the application 50 detecting a triggering event. When the video file is created in response to the triggering event, the application 50 accesses and stores files created prior to the triggering event to thereby record a video of the triggering event occurring. Generally, the application 50 stores temporary files in a buffer memory when in the active state. Upon detection of a triggering event, the application 50 accesses one or more of the temporary files before the temporary files are automatically deleted. The ability of the system 10 to access and then save the temporary files allows for the application 50 to retrieve unintentionally recorded files when necessary. Conventionally, the user must intentionally record a video file for the video file to later be accessible to the user. For example, most if not all apps require a positive user instruction—such as a selection of a "video stop/start" button, a "capture photo," a "shutter" button, or the like that is displayed on the window 60—to initiate the generation of a video file. Moreover, none of the conventional systems include a single window that includes two different video feeds (i.e., two of the sections 60a, 60b, and 60c) and/or two video feeds and a map overlay (i.e., all sections 60a-60c).

Figure 2:
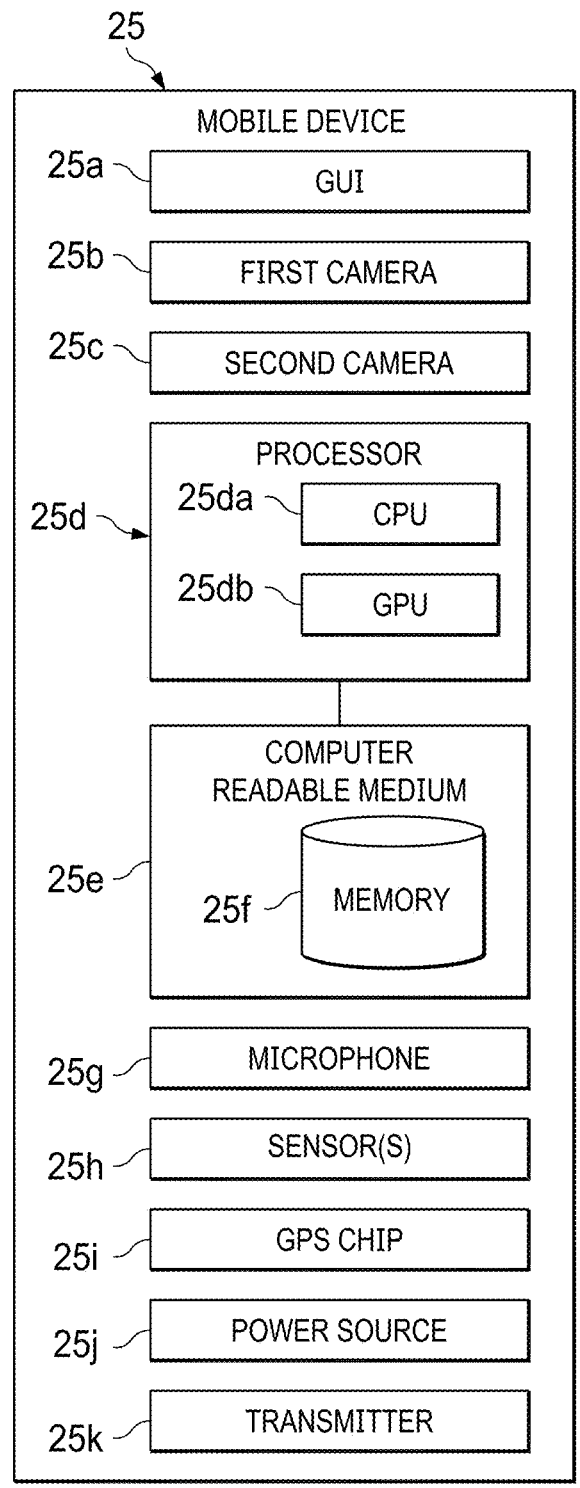
FIG. 2 is a diagrammatic illustration of the mobile device of FIG. 1, according to an example embodiment.

In an example embodiment, as illustrated in FIG. 2 with continuing reference to FIG. 1, the mobile device 25 includes the UI 25a, the first camera 25b, the second camera 25c, a computer processor 25d, and a computer readable medium 25e operably coupled thereto. Instructions accessible to, and executable by, the computer processor 25d are stored on the computer readable medium 25e. Memory 25f is also formed in the computer readable medium 25e. As illustrated, the processor 25d includes a central processing unit ("CPU") 25da and a graphics processing unit ("GPU") 25db. Generally, the UI 25a can display a plurality of windows or screens to the user. The mobile device 25 also includes an input device and an output device. In some embodiments, the input device and the output device are the UI 25a. In some embodiments, the input device includes a microphone 25g and the output device is a speaker. Generally, the mobile device 25 also includes sensor(s) 25h, a Global Positioning System ("GPS") chip 25i, a power source 25j, and a transmitter 25k. The transmitter 25k enables the mobile device 25 to connect to the network 30. In several example embodiments, the mobile device 25 is, or includes, a telephone, a tablet, a personal computer, a personal digital assistant, a cellular telephone or mobile phone, other types of telecommunications devices, other types of computing devices, and/or any combination thereof.

In one or more example embodiments, the application 50 is stored in the computer readable medium 40 of the computer 15 and in the computer readable medium 25e of the mobile device 25. In some embodiments, the application 50 includes and/or executes one or more web-based programs, Intranet-based programs, and/or any combination thereof. In an example embodiment, the application 50 includes a computer program including a plurality of instructions, data, and/or any combination thereof. In an example embodiment, the application is written in, for example, Hypertext Markup Language ("HTML"), Cascading Style Sheets ("CSS"), JavaScript, Extensible Markup Language ("XML"), asynchronous Javascript and XML ("Ajax"), iOS, XCode, Swift, Android for mobile, and/or any combination thereof. In an example embodiment, the application 50 is a web-based application written in, for example, Java or Adobe Flex, which pulls real-time information from the mobile device 25 and/or the plurality of data sources 20. In an example embodiment, the application 50 pulls real-time information from the plurality of data sources 20, upon the execution, opening, or start-up of the application 50. In some embodiments, the application 50 is or includes a mobile front-end application downloaded on the mobile device 25 of the user and a backend application stored or downloaded on the computer 15. Generally, the mobile front-end application communicates with the backend application. In some embodiments, the application 50 accesses the first camera 25b, the second camera 25c, and the microphone 25g of the mobile device 25.

Figure 3:
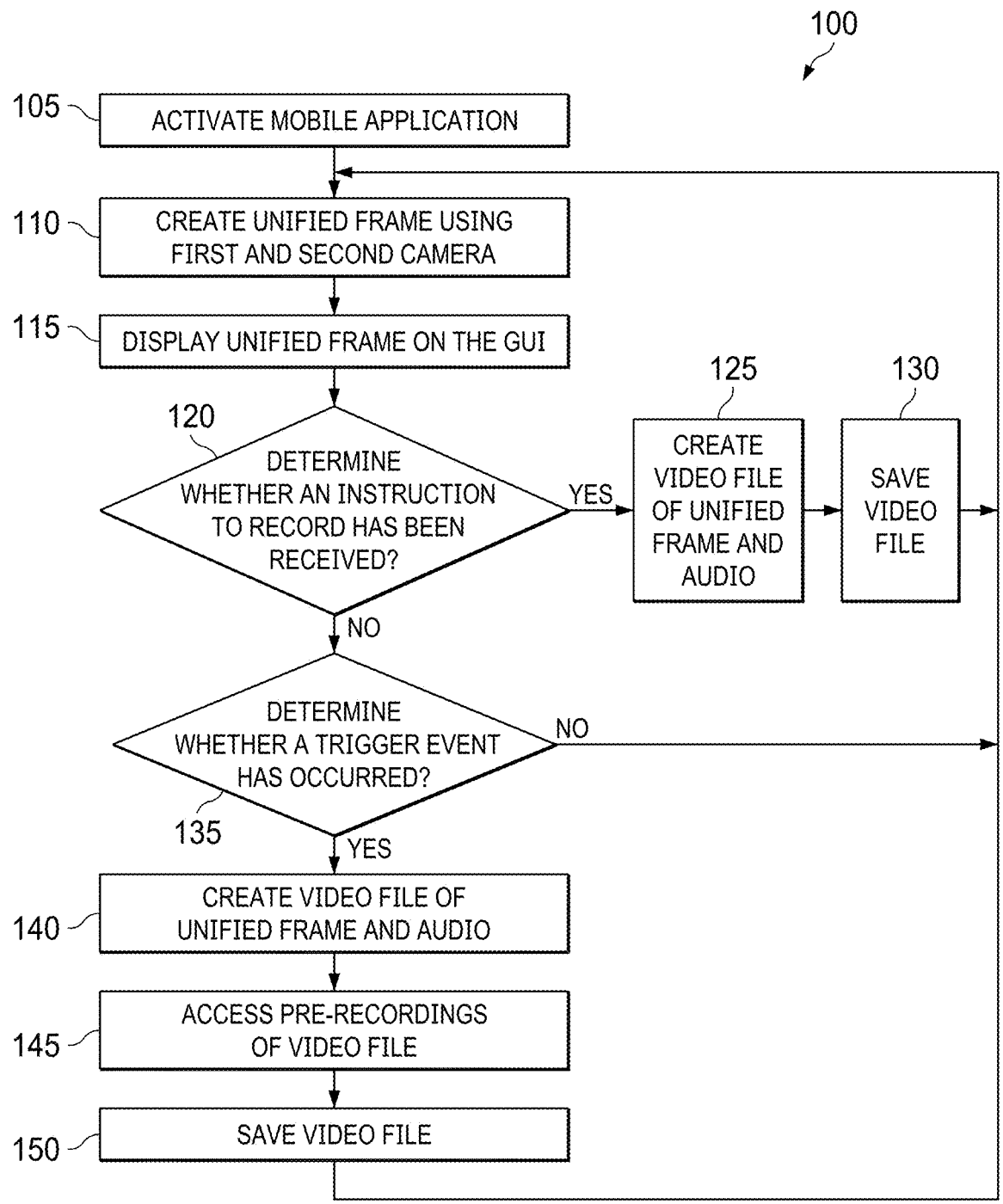
FIG. 3 is a flow chart illustration of a method of operating the system of FIG. 1, according to an example embodiment.

In an example embodiment, as illustrated in FIG. 3 with continuing reference to FIGS. 1-2, a method 100 of operating the system 10 includes activating the application 50 at step 105; creating a unified window using the first camera 25b and the second camera 25c at step 110; displaying the unified window on the UI 25a at step 115; and determining whether an instruction to record has been received at step 120. If it is determined that an instruction to record has been received, then the method 100 includes creating a video file that includes the unified window and audio at step 125, saving the video file at step 130, and then the next step is step 110. If it is determined that an instruction to record has not been received, then the method 100 includes determining whether a triggering event has occurred at step 135. If it is determined that a triggering event has occurred at the step 135, then the method 100 includes creating a video file that includes the unified window and audio at step 140, accessing pre-recordings of the video file at step 145, saving the video file at step 150, and then the next step is the step 110. If it is determined that a triggering event has not occurred at the step 135, then the next step is the step 110.

In some embodiments and at the step 105, the application 50 is activated. Generally, mobile apps are in one of five states: "not running" in which the app has not started yet or was running and has been terminated; "inactive" in which the app is running in the foreground but is not receiving any events (e.g., when the app is in the foreground but then a call or message is received); "active" in which the application is running in the foreground and receiving events; "background" in which the app is running in the background and executing its code; and "suspended" in which the app is in the background but is not executing its code. During the step 105, the application 50 is activated such that it is in the active state. In some embodiments, the application 50 is activated by the user 55 selecting the app icon associated with the application 50. In other embodiments, the application 50 is activated via an event that is independent of the user selecting the app icon. For example, the application 50 may be activated upon the mobile device 25 and/or the application 50 detecting that the mobile device 25 is positioned within a car or other vehicle. Specifically, the application 50 may be automatically activated upon the mobile device 25 being paired—via Bluetooth technology or via a physical cable—to a vehicle in preparation of the user driving the vehicle. In some embodiments, the activation of the application 50 is a requirement for the user to operate the vehicle.

Figure 4:
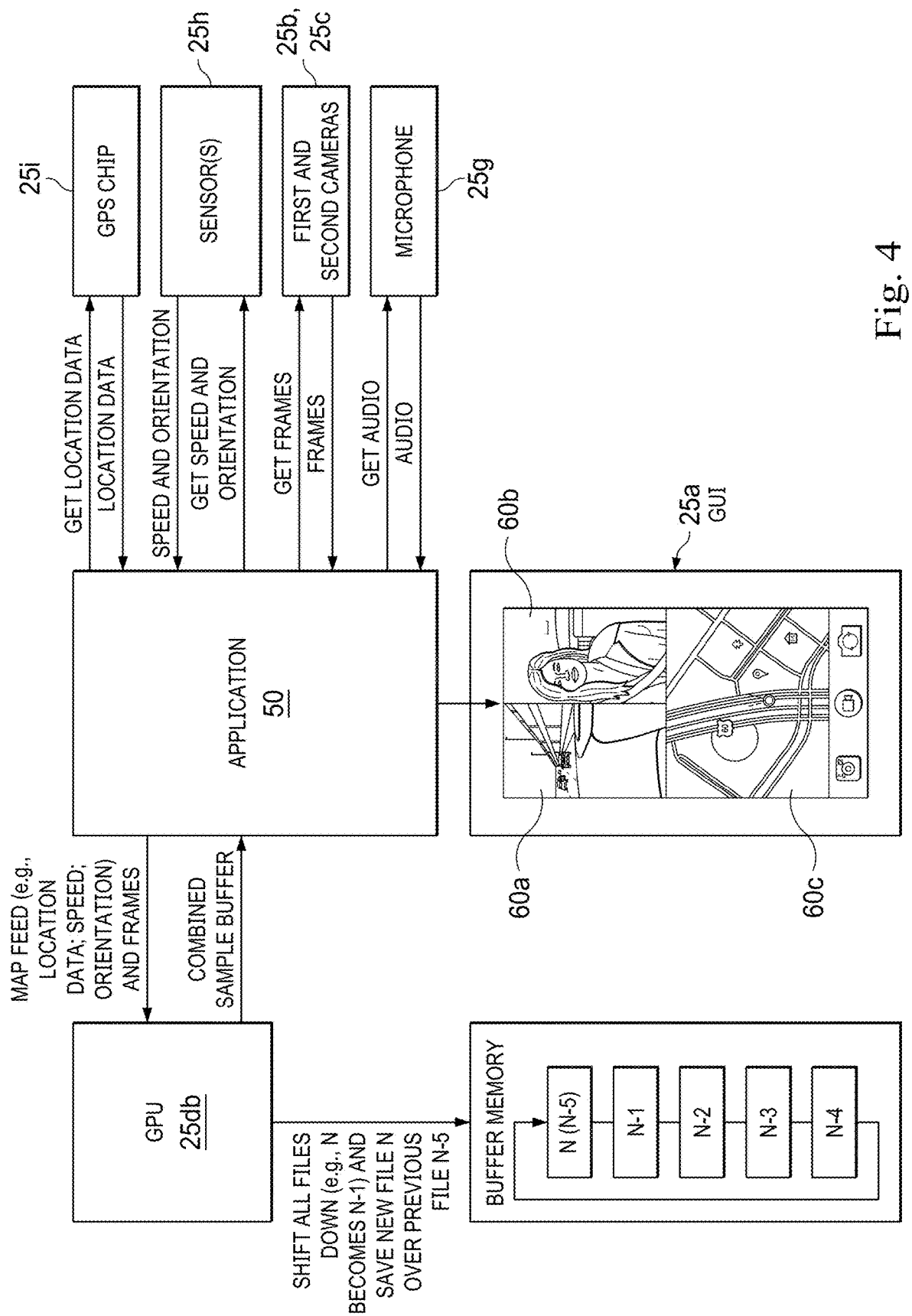
FIG. 4 is an illustration of the data flow associated with the mobile application and the mobile device of FIG. 1, according to an example embodiment.

In some embodiments and at the step 110, the application 50 creates a unified window using the first camera 25b and the second camera 25c. FIG. 4 is an example data flow associated with the application 50. In some embodiments and during the step 110, the application 50 takes or identifies a video feed from the first camera 25b, a video feed from the second camera 25c—and if applicable—a generated map overlay, within the context of a 16:9 aspect ratio "canvas." For each frame or image of the feeds and overlay that is to be combined into the single window, the application 50 identifies the pixels for each feed. The application 50 then draws each pixel into a new window, that combines all video feeds and the map overlay (or the two video feeds if the map overlay is turned off) into a single, unified window. This unified image/window is sent out back to the application 50 in a format that can be written to a video file. In some embodiments, the application 50 captures simultaneously over a period of time: the video feed from the first camera 25b, the video feed from the second camera 25c, the generated map overlay, and optionally audio from the microphone 25g. In some embodiments, the writing to the single video file is done in the processor 25d. In some embodiments, the GPU 25db is used specifically for combining the two separate feeds and map overlay into a single window that can be used to write a single video file, instead of separate video files for each of the feeds and overlay. While FIG. 4 illustrates the mobile application 50 accessing the location data, speed, and orientation data directly from the GPS chip 25i and the sensor(s) 25h, in some embodiments, the application 50 accesses the location data, the speed data, and the orientation data via Core Location framework by Apple Inc., of Cupertino, California, which allows the application 50 to access the user's speed, and heading, and GPS data. In some embodiments, the step 110 includes the application 50 generating and/or sending a map overlay or feed (e.g., location data, speed data, and orientation data) and front/back camera frames or feeds to the GPU 25db and the GPU 25db sends back a combined sample buffer to the application 50. In some embodiments, and when the combined sample buffers from the two camera feeds for a single window are available and being converted into a format that Metal frame work by Apple Inc., of Cupertino, California, can read, the application 50 converts a map overlay at that instant into the same kind of image format that is readable by the Metal framework. That is, and in some embodiments, the application 50 creates an image of what the map is showing for every frame of video. This map image is then sent to the Metal framework and the GPU 25db generates a map overlay based on the map images or the map location data. When the map display is enabled in the application 50, then the GPU generates a single, unified window that includes the first camera feed, the second camera feed, and the map overlay. Generally, the map overlay is associated with the section 60c. In some embodiments, the map overlay includes movement of the mobile device 25 relative to a map and may include an indication of a speed of the mobile device 25, an orientation of the mobile device 25, and/or compass data.

Figure 5:
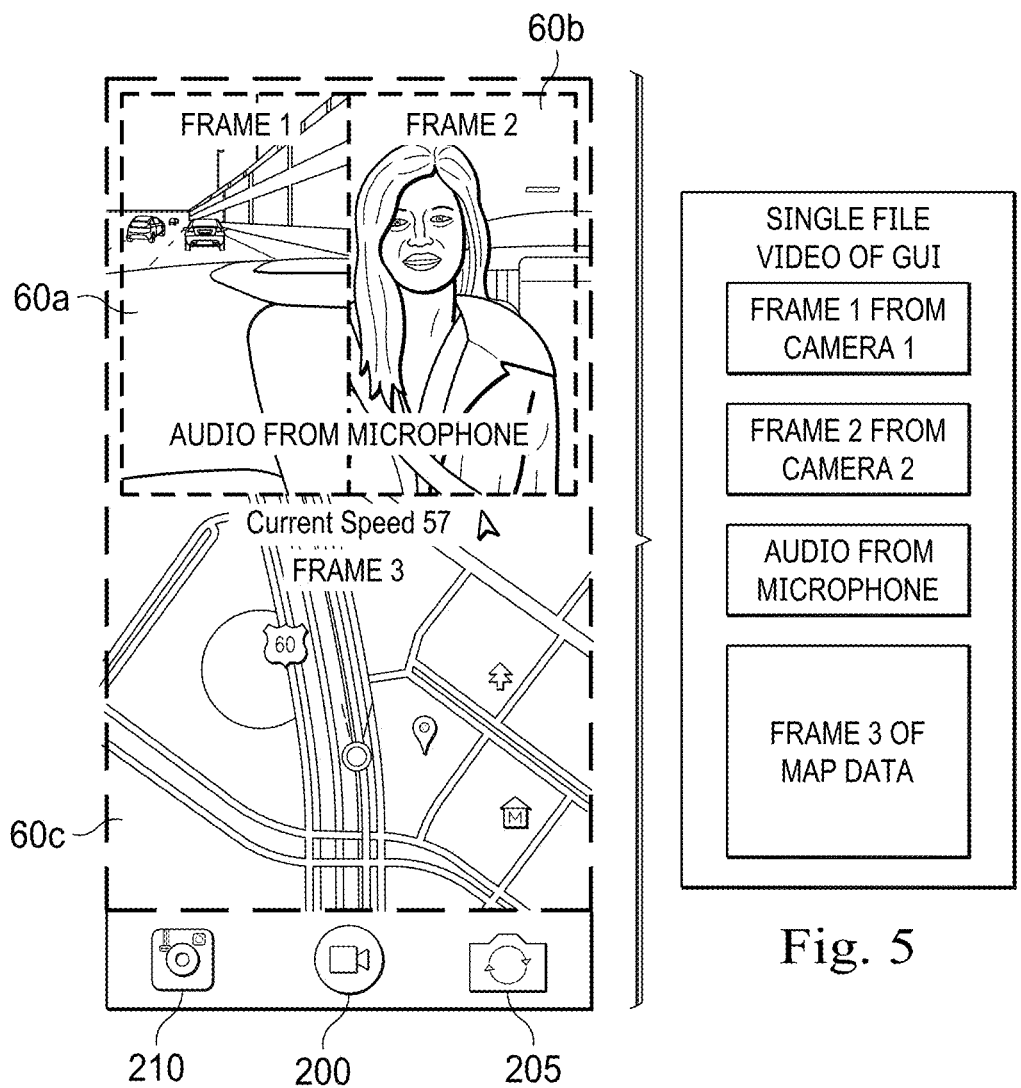
FIG. 5 is a diagrammatic illustration of annotated window displayed on the mobile device of FIG. 1, according to an example embodiment.

In some embodiments and at the step 115, the application 50 displays the unified feed or window on the UI 25a. An example window displayed by the application 50 is illustrated in FIG. 5. The unified window incudes the feed or frame from the first camera 25b in the first section 60a, the feed or frame from the second camera 25c in the second section 60b of the window, and map overlay in the third section 60c. The application 50 may also display a selectable "video stop/start" button 200, a selectable "camera-lens toggle" button 205, and a selectable "change window arrangement" button 210. The application 50 is not limited to the displaying the buttons 200, 205, and/or 210, and any one or more of the buttons 200, 205, and 210 may be omitted and/or replaced with a variety of other selectable buttons.

Referring back to FIG. 3, the application 50 determines whether an instruction to record has been received at the step 120. In some embodiments, the instruction to record includes an indication that the "video stop/start" 200 button has been selected by the user. However, the instruction to record may be received via the microphone 25g in some instances or via another type of input (e.g., depression of a physical button that forms a portion of the mobile device 25, a swiping motion across the face of the UI 25a, a small shaking movement of the mobile device 25).

In some embodiments and at the step 125, the application 50 creates a single video file that includes the uniform window and audio. In some embodiments, the window 60 displays a real-time or near real-time depiction of the feeds from the first camera 25b and the second camera 25c. Generally, the single video file includes a recording of the window 60 over time as well as the audio that is captured over the same time period. Referring to FIG. 4, temporary video files, such as video files of 3 seconds each, are saved. Generally, the saving of the temporary video files occurs in a data buffer or buffer memory. As illustrated, each temporary video file is labeled as: N being the most recently stored video file; N−1 being the second most recently stored video file; N−2 being the third most recently stored video file; N−3 being the fourth most recently stored video file; and N−4 being the fifth most recently stored video file. When the buffer memory includes temporary video files having a total time at or exceeding a predetermined period of time (e.g., 30 seconds) or contains a predetermined number of files (e.g., 10 files), the application 50 queues the oldest file for deletion. In some embodiments and as illustrated in FIG. 4, the oldest video file is then deleted to create room for the newest video file. In some embodiments, the predetermined period of time is 30 seconds with each video file being approximately 3 seconds long. In the method 100 and when there is an indication that the user 55 wants to record, the application 50 retrieves or combines a number of temporary or buffer files to create the single video file. Generally, the application 50 continues recording until the application 50 determines that an instruction to stop recording is received. For example, the selectable "video start/stop" button may be selected to provide an instruction to the application 50 to stop recording.

In some embodiments and at the step 130, the application 50 saves the single video file. In some embodiments, the saving of the video file causes the video file to be stored in the mobile device 25 and is accessible via a Camera Roll application of the mobile device 25. In other embodiments, the single file is stored in the computer 15, in "the cloud" or in another location that is accessible to the user 55.

In some embodiments and at the step 135, the application determines whether a triggering event has occurred. In some embodiments, a triggering event includes motion of the mobile device 25 that meets or exceeds a predetermined threshold. In some embodiments, the motion is measured or monitored via the sensor(s) 25*h*, such as an accelerometer. In some embodiments, the application 50 accesses sensor data (e.g., accelerometer data) via Core Motion framework by Apple Inc., of Cupertino, California. In some instances, the predetermined threshold is configured to detect hard braking or the abrupt changes in acceleration. For example, to detect hard braking, the application 50 listens for changes in acceleration in the X direction (e.g., first horizontal direction), Y direction (e.g., vertical direction), and Z direction (e.g., second horizontal direction perpendicular to both the X and Y directions) via the Core Motion framework and the sensor(s) 25*h*. One example of a predetermined threshold is +/−0.4 g-force ("g's") or gravitational force equivalent. As such, a detection of +/−0.4 g's in the X or Y direction is considered a triggering event. Moreover, the detection of −0.4 in the Z direction is considered a triggering event. Triggering events often occur when the mobile device 25 is in a car. For example, the application 50 may detect +/−0.4 g's in the X or Y direction if the mobile device 25 is in a car that loses control or begins to roll over. The application 50 may detect −0.4 g's in the Z direction if the mobile device 25 is in a car that slows down very suddenly, which is often considered a "hard braking" event.

Generally, the step 140 is similar to the step 125. As such, a description of the aspects of the step 140 similar to the step 125 will not be provided here. Regardless of the type of triggering event, in response to the determination that the triggering event has occurred, the application 50 begins to create a single video file of the window 60 and audio at the step 140. In some embodiments and at the step 140, the video file created during the step 140 is of a predetermined length of time. For example, and in response to a triggering event, the application 50 creates a video file having a 10 second duration after determining that a triggering event occurred.

In some embodiments, the step 145 the application 50 accesses or retrieves pre-recordings or temporary files of the video file. When a triggering event or instruction is detected, the application retrieves pre-recordings or temporary files stored in the buffer memory to create the single video file, which includes video that was generated prior to the triggering event.

Generally, the step 150 is similar to the step 130. As such, a description of the aspects of the step 150 similar to the step 130 will not be provided here. At the step 150, the video file saved is a combination of the video file created during the step 140 and the pre-recordings of video file accessed in the step 145. For example, the video file created during the step 140 is combined with the pre-recordings accessed during the step 145 to create a video file having a duration that includes a time period covered by the pre-recordings of step 145 and the video file of the step 140. As such, and in addition to the video file that begins at or directly after the triggering event, the application also accesses video files that were recorded prior to the triggering event. In some embodiments, the total video file includes twenty seconds of video before the triggering event and ten seconds of video after the triggering event.

After the steps 130, 135, and 150 the next step is the step 110 and the process may be repeated any number of times.

The disclosure is not limited to combining—into a single window—frames or feeds generated from camera(s) and images or videos relating to or including maps. In some embodiments, the application 50 stitches together—into a single window—feeds from two, three, or more mobile applications or application programming interfaces. Example mobile applications include social media applications such as Instagram® Facebook®, Twitter®; productivity applications such as Microsoft Outlook®; streaming applications such as Netflix®; shopping/purchasing applications such as Amazon®; communication applications such as Facetime®, WhatsApp®, Slack®, etc. As such, and when a first application includes feed from a front-facing camera, a user may simultaneously view content and interact with a second application while also recording their reaction to the content in the second application via the front-facing camera. In some embodiments, a front-facing camera is associated with a first application, a rear-facing camera is associated with a second application, and a map view is associated with a third application.

In some embodiments, a feed is associated with a mobile application but is not captured directly from the mobile application. For example, the application 50 may identify a feed captured by the camera without interacting with a "Camera" mobile application. Instead, the application 50 interacts or communicates with an application programming interface or a framework, such as AVFoundation framework, to obtain the feed from the camera. However, the feed may still be associated with the "Camera" mobile application, specifically if the content in the frame/feed mimics the content/display/configuration of the "Camera" mobile application. Similarly, a frame/feed may be associated with a "Google Maps" mobile application when the content in the frame/feed mimics the content/display/configuration of the "Google Maps" mobile application.

In some embodiments and during the method 100, the application 50 has instructions executed by the CPU 25*da* and instructions executed by the GPU 25*db*. In some embodiments, the application 50 has instructions that are executed by the GPU 25*db* instead of the CPU 25*da*, which improves the functioning of the mobile device 25. That is, the application 50 has instructions that bypass the CPU 25*da* to be executed on the GPU 25*db*, which increases the processing capacity and speed of the mobile device 25. The division of instructions between the CPU 25*da* and the GPU 25*db* allows for the application 50 to run much faster and more efficiently (i.e., less battery drain or decreased power consumption) when compared to all of the instructions being executed or carried out by the CPU 25*da* or even requiring interaction of the CPU 25*da*. In some embodiments, the division of instructions between the CPU 25*da* and the GPU 25*db* allows for the application 50 to display the first camera feed, the second camera feed, and the map overlay on the window 60 in real time. Specifically, the use of the GPU 25*db* for the creation of the unified window increases the processing speed of the application 50 when compared to the CPU 25*da* creating the unified window. In some instances, the application 50 allows the GPU 25*db* to execute instructions or commands with little or no CPU interaction. As requiring CPU interaction can result in slow processing speeds, the application 50 is a solution to a technical problem of slow processing speeds, specifically for dual camera feed displays.

In several example embodiments, execution of one or more steps of the method 100 enables a user to forgo checking/viewing several applications sequentially to view first app content and then second app content. Instead, in several example embodiments, execution of one or more steps of the method 100 results in the simultaneous display of the first app content (e.g., dual camera display or camera app) and the second app content (e.g., map content). As such, the display of the first section 60*a*, the second section 60*b*, and the third section 60*c* simultaneously improves the functioning of the computer 15 because the processing load of the mobile device 25 is reduced and/or the required memory of the mobile device 25 is reduced by eliminating the requirement to alternate activation of the first app and the second app repeatedly. Thus, the application 50 improves the functioning of the mobile device 25 itself. That is, the system 10 results in specific improvements in computer capabilities (i.e., reduction of required memory and reduction of processing load) of at least the mobile device 25.

Referring back to FIG. 1 and in some embodiments, the computer 15 is omitted or replaced with a remote server (e.g., "the cloud"). In some embodiments, the computer 15 forms a portion of the cloud. In some embodiments, the computer 15 is or includes an application server. In some embodiments, the computer 15 is remote from the mobile device 25.

In some embodiments, the video file is received by the computer 15 directly from the mobile device 25 via the network 30. In some embodiments, the application 50 automatically pushes the video file from the mobile device 25 to the computer 15 or to the cloud, and then the application 50 automatically deletes the video file from the mobile device 25 thereby reducing memory usage of the mobile device 25 by the application 50. In an example embodiment of the system 10, and when the application 50 pushes the video file from the mobile device 25 and then deletes the video file from the mobile device 25, the video file is not stored in the Camera Roll of the mobile device 25. Thus, the application 50 enables the storage of memory-intensive video files in a computer that is remote from the mobile device 25 and improves the functioning of the mobile device 25 itself because the video file is not stored in the memory of the mobile device 25. Approaching a memory limit of the mobile device 25 can negatively impact the responsiveness of the mobile device 25. Thus, the effective capture and recording of the video file using the mobile device 25 without storing the video file in the Camera Roll allows the mobile device 25 to perform the actions of capturing and recording while reducing memory usage of the mobile device 25.

In some embodiments, a video file associated with a triggering event is automatically uploaded to a third party or the computer 15. For example, and when the activation of the application 50 is a requirement for the user to operate the vehicle, a video file associated with a triggering event is automatically uploaded to a third party such as an employer of the user 55 or owner of the vehicle.

In one embodiment, the plurality of data sources 20 includes GPS satellites, other databases, or data sources providing data to the application 50.

In an example embodiment, the network 30 includes the Internet, one or more local area networks, a Bluetooth low energy network, one or more wide area networks, one or more cellular networks, one or more wireless networks, one or more voice networks, one or more data networks, one or more communication systems, and/or any combination thereof.

Figure 7:
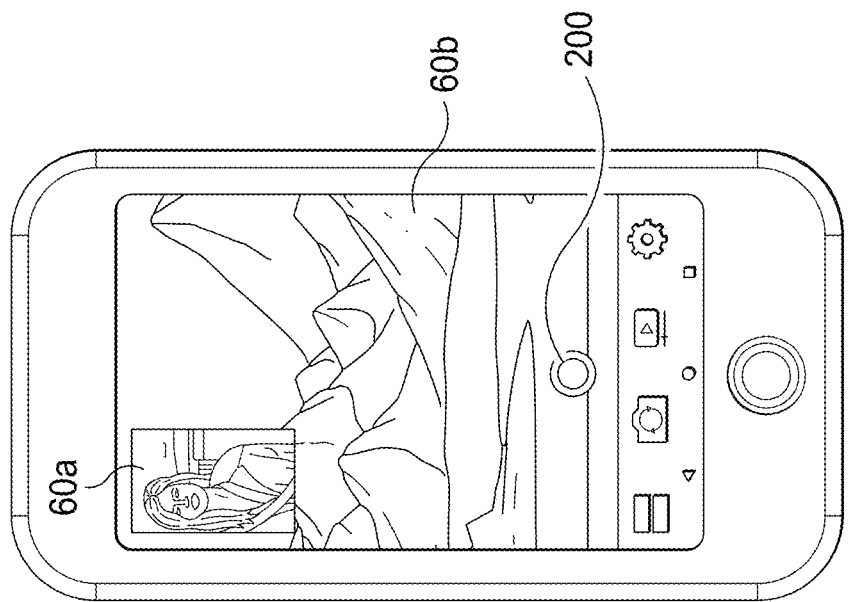
FIG. 7 is a diagrammatic illustration of another example window displayed on the mobile device of FIG. 1 during the method of FIG. 3, according to an example embodiment.
Figure 6:
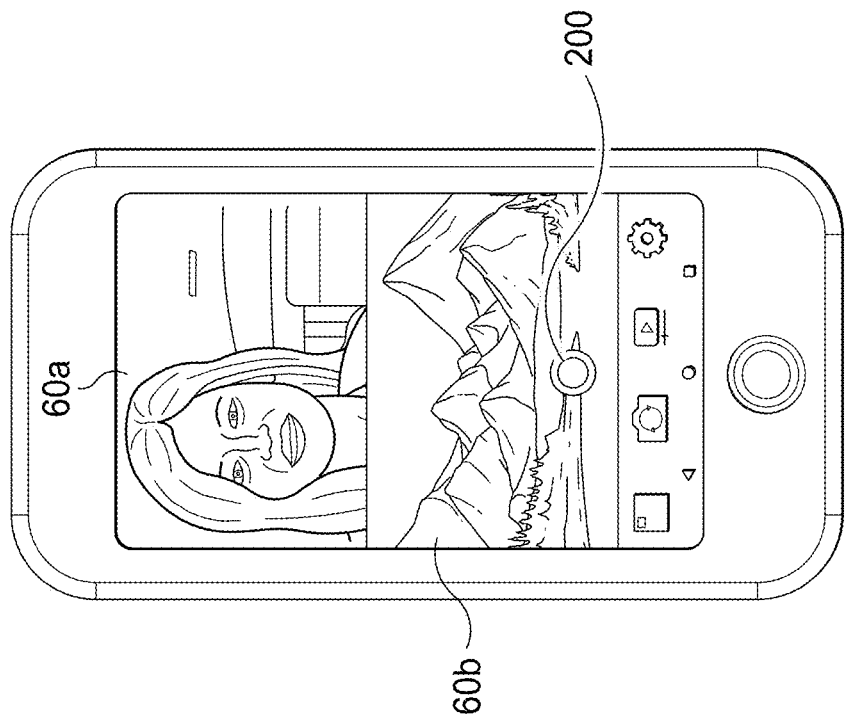
FIG. 6 is a diagrammatic illustration of an example window displayed on the mobile device of FIG. 1 during the method of FIG. 3, according to an example embodiment.

The system 10 may be altered in a variety of ways. For example, the third section 60*c* may be omitted from the window 60, as illustrated in FIG. 6. Moreover, the sizing and position of the first section 60*a* relative to the second section 60*b* can be altered, as illustrated in FIG. 7.

In some embodiments, the application 50 records events occurring around the mobile device 25 when the mobile device 25 is positioned within a car. For example, the user may use the map displayed in the third section 60*c* to navigate while enabling video capture of a triggering event that occurs while driving (i.e., car accident detected via the sensor(s) 25*h*). However, the application 50 may also record other non-vehicular events such as the surroundings of the mobile device 25 when the mobile device is used for recreational/sporting activities. For example, the application 50 may record events occurring around the mobile device 25 when the mobile device 25 accompanies the user while the user is snow skiing, snow shoeing, running, etc. The recording of events may relate to personal accomplishments of the user (e.g., maximum speed of the user while snow skiing) or to the safety of the user (e.g., recording a collision of the user and another skier). As the application 50 records events relating to non-vehicular use, the map display is not limited to street maps, but can also include terrain and/or nature/ski trails, etc.

In some embodiments, the application 50 is configured to allow the user 55 to change the display of the third section 60*c* or the map portion. That is, the application 50 is configured to receive instructions from the user 55 to zoom in, zoom out, and scroll over the mapped area displayed in the third section 60*c*. In response to the receipt of instructions to zoom in on the content of the third section 60*c*, the application 50 enlarges or zooms in on the content displayed in the third section 60*c* while the third section 60*c* is displayed on the UI 25*a*. In some embodiments, the type of map displayed in the third section 60*c* is a standard map type, a satellite map type, or a hybrid map type.

In some embodiments, the application 50 applies an effect generator or layer over at least a portion of the window 60 such that the unified, single window and resulting single video file includes an effect (e.g., confetti falls from the top of the screen throughout a portion of the video file), an annotation, a selected and preset animation, etc.

In some embodiments, the single video file is a multimedia file. In some embodiments, the single video file includes a recording of a display that details a speed, an orientation, and location of the mobile device along with the front-facing and rear-facing camera feeds. Instead of recording three files that may or may not be associated together, the single video file ensures the integrity of the data displayed on the window 60.

In some embodiments, the application 50 automatically exports the single video file to the Camera Roll of the mobile device. In some embodiments, the application 50 configures the single video file to run on a loop (infinite loop, back and forth loop, or reverse loop). In some embodiments, the application 50 saves a portion of a song or sound effect in addition to, or in place of, the audio captured via the microphone 25g. As such, the video file includes a portion of a song or sound effect in addition to, or in place of, the audio captured via the microphone 25g.

In some embodiments, the ability to monitor for a triggering event is enabled when the mobile device 25 is travelling at a minimum speed, such as for example 10 miles per hour (16.09 km per hour).

In one aspect, the present disclosure is directed to a method of simultaneously displaying a first video feed, a second video feed, and a map overlay within a single window that is generated by a mobile application, the method including: identifying, using the mobile application that is stored in a mobile device, the first video feed that is generated by a front-facing camera of the mobile device; identifying, using the mobile application, the second video feed that is generated by a rear-facing camera of the mobile device; generating, using the mobile application, the map overlay using location data of the mobile device; creating, using the mobile application and a graphics processing unit ("GPU") of the mobile device, the single window that includes the first video feed, the second video feed, and the map overlay; displaying, on a user interface and using the mobile application, the single window; recording over a period of time, using the mobile application, the displayed single window; and storing the recording of the displayed single window as a single video file. In one embodiment, the method also includes recording over the period of time, using the mobile application and a microphone of the mobile device, audio captured by the microphone; and wherein the single video file also comprises the recorded audio. In one embodiment, the method also includes: storing the single video file in a buffer memory of the mobile device; and retrieving the single video file from the buffer memory of the mobile device In one embodiment, the method also includes: detecting, using the mobile application and after the single video file is stored in the buffer memory, a triggering event; wherein the retrieval of the single video file from the buffer memory is in response to the detection of the triggering event. In one embodiment, the mobile device comprises an accelerometer that measures acceleration of the mobile device; wherein the method further comprises detecting, using the mobile application, that acceleration of the mobile device has met or exceeded a predetermined threshold; and wherein retrieving the single video file from the buffer memory of the mobile device is in response to the detection of the mobile device meeting or exceeding the predetermined threshold. In one embodiment, the creation of the single window uses the GPU of the mobile device but occurs without interaction with a central processing unit ("CPU") of the mobile device. In one embodiment, the creation of the single window without CPU interaction improves processing capacity of the mobile device and reduces power consumption of the mobile device.

In one aspect, the present disclosure is directed to an apparatus adapted to display multiple video feeds in a single window, the apparatus comprising: a mobile device comprising: a user interface ("UI"); a first camera; a second camera; and one or more processors, the one or more processors comprising a graphics processing unit ("GPU"); and a non-transitory computer readable medium having stored thereon a plurality of instructions, wherein the instructions are executed with the one or more processors so that the following steps are executed: generating a first video feed using the first camera; generating a second video feed using the second camera; creating, using the GPU, a single window that includes the first video feed and the second video feed; and displaying, on the UI, the single window. In one embodiment, the instructions are executed with the one or more processors so that the following steps are also executed: recording, over a period of time, the displayed single window; and storing the recording as a single video file. In one embodiment, the single video file is stored in a buffer memory of the mobile device; wherein the instructions are executed with the one or more processors so that the following steps are also executed: detecting a triggering event that occurs during the period of time; retrieving, in response to the detection of the triggering event, the single video file from the buffer memory. In one embodiment, the instructions are executed with the one or more processors so that the following step is also executed: generating a map overlay using location data of the mobile device; and wherein the GPU creates the single window using the map overlay such that the single window further includes a mapped location of the mobile device. In one embodiment, the mobile device further comprises a microphone; wherein the recording further includes audio captured by the microphone over the period of time; and wherein the single video file includes the audio. In one embodiment, the one or more processors further comprise(s) a central processing unit ("CPU"); and wherein the instructions are executed so that the GPU bypasses the CPU to create the single window using the map overlay. In one embodiment, the GPU bypassing the CPU to create the single window improves processing capacity of the mobile device and reduces power consumption of the mobile device. In one embodiment, the instructions are executed with the one or more processors so that the following steps are also executed: pushing the single video file from the mobile device and to a remote computer that is in communication with the mobile device via a network; and automatically deleting the single video file from the mobile device after pushing the single video file from the mobile device and to the remote computer. In one embodiment, the automatic deletion of the single video file from the mobile device allows for the single video file to be stored in the remote computer while reducing memory usage of the mobile device. In one embodiment, the mobile device further comprises a first sensor that generates sensor data; and wherein the instructions are executed with the one or more processors so that the following step is also executed: determining, based on the sensor data, that the sensor data has met or exceeded a threshold; and wherein recording the displayed single window is in response to the determination that sensor data has met or exceeded the threshold. In one embodiment, the first sensor is an accelerometer; and wherein the threshold is associated with a predetermined acceleration.

In one aspect, the present disclosure is directed to a method of bypassing a CPU of a mobile device to generate a single video file using a GPU of the mobile device, the method comprising: simultaneously identifying, using a mobile application stored in the mobile device, a first video feed of a front-facing camera of the mobile device and a second video feed using a rear-facing camera of the mobile device; sending, using the mobile application, the first video feed and the second video feed to the GPU while bypassing the CPU; generating, using the GPU, a single window that includes the first video feed and the second video feed; displaying, on a user interface and using the mobile application, the single window to provide a real-time feed of the front-facing and rear-facing cameras; recording over a period of time, using the mobile application, the displayed single window to generate the single video file; wherein the single video file includes the first video feed and the second video feed. In one embodiment, sending the first video feed and the second video feed to the GPU while bypassing the CPU improves processing capacity of the mobile device and reduces power consumption of the mobile device. In one embodiment, the method also includes capturing audio over the period of time; wherein the single video file further comprises the captured audio such that the single video file is a multi-media file. In one embodiment, the method also includes: obtaining, using the mobile application, map location data of the mobile device during the period of time; and generating, using the GPU, a map overlay based on the map location data; wherein the single window further includes the map overlay.

In one aspect, the present disclosure is directed to a method of combining a first video feed and a second video feed associated with an application programming interface into a single window generated by a mobile application, the method comprising: identifying, using the mobile application stored in a mobile device, the first video feed associated with the application programming interface; identifying, using the mobile application, the second video feed associated with the application programming interface; generating, using the mobile application and a graphics processing unit ("GPU") of the mobile device, the single window, wherein the single window includes the first video feed and the second video feed; and displaying, on a user interface ("UI") of the mobile device and using the mobile application, the single window. In one embodiment, generating the single window comprises: identifying a first plurality of pixels of the first video feed; identifying a second plurality of pixels of the second video feed; and drawing the first plurality of pixels and the second plurality of pixels into the single window. In one embodiment, the method also includes: generating, using the mobile application, a map overlay using location data of the mobile device; wherein the single window comprises: a first section; a second section; and a third section; wherein the first section includes the first video feed; wherein the second section includes the second video feed; and wherein the third section includes the map overlay; and zooming in on the map overlay while the single window is displayed on the UI. In one embodiment, the method also includes receiving an instruction from a user of the mobile device to zoom in on the map overlay; and wherein zooming in on the map overlay is in response to the receipt of the instruction from the user. In one embodiment, the single window is recorded over a period of time to generate a single video file. In one embodiment, the method also includes: storing the single video file in a buffer memory of the mobile device; detecting a triggering event that occurs during the period of time; and retrieving, in response to the detection of the triggering event, the single video file from the buffer memory. In one embodiment, the method also includes storing the single video file in a buffer memory of the mobile device; detecting a triggering event that occurs after the period of time; and retrieving, in response to the detection of the triggering event, the single video file from the buffer memory.

Figure 8:
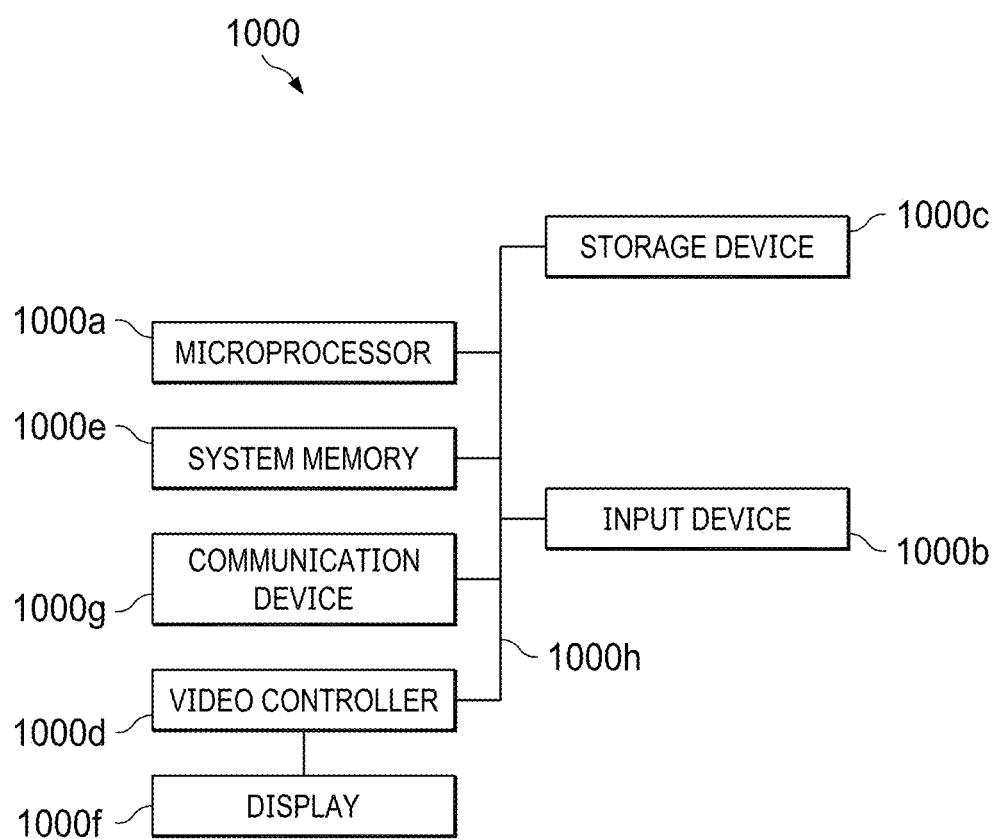
FIG. 8 is a diagrammatic illustration of a node for implementing one or more example embodiments of the present disclosure, according to an example embodiment.

In an example embodiment, as illustrated in FIG. 8 with continuing reference to FIGS. 1-7, an illustrative node 1000 for implementing one or more of the example embodiments described above and/or illustrated in FIGS. 1-7, is depicted. The node 1000 includes a microprocessor 1000$a$, an input device 1000$b$, a storage device 1000$c$, a video controller 1000$d$, a system memory 1000$e$, a display 1000$f$, and a communication device 1000$g$ all interconnected by one or more buses 1000$h$. In several example embodiments, the storage device 1000$c$ may include a floppy drive, hard drive, CD-ROM, optical drive, any other form of storage device and/or any combination thereof. In several example embodiments, the storage device 1000$c$ may include, and/or be capable of receiving, a floppy disk, CD-ROM, DVD-ROM, or any other form of computer-readable medium that may contain executable instructions. In several example embodiments, the communication device 1000$g$ may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1-7, include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-7, include respective pluralities of same components.

In several example embodiments, one or more of the applications, systems, and application programs described above and/or illustrated in FIGS. 1-7, include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous Javascript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of simultaneously displaying a first video feed and a second video feed within a single window that is generated by a mobile application, the method including:
   identifying, using the mobile application that is stored in a mobile device, the first video feed that is generated by a front-facing camera having a view of a user of the mobile application;
   identifying, using the mobile application, the second video feed that is associated with a second application;
   wherein the second video feed comprises content displayed by the second application; and
   wherein the content displayed by the second application is independent of a location of the mobile device;
   creating, using the mobile application, the single window that includes the first video feed and the second video feed;
   displaying, on a user interface and using the mobile application, the single window;
   recording over a period of time, using the mobile application, the displayed single window; and
   storing the recording of the displayed single window as a single video file.

2. The method of claim 1, further comprising:
   wherein the recording of the displayed single window is stored in a memory of the mobile device as the single video file;
   detecting, using the mobile application and after the single video file is stored in the memory of the mobile device, a triggering event; and
   retrieving the single video file from the memory of the mobile device;
   wherein the retrieval of the single video file from the memory is in response to the detection of the triggering event.

3. The method of claim 2,
   wherein the memory is a buffer memory of the mobile device; and
   wherein the method further comprises:
     pushing the single video file from the mobile device and to a remote computer that is in communication with the mobile device via a network; and
     automatically deleting the single video file from the mobile device after pushing the single video file from the mobile device and to the remote computer.

4. The method of claim 1, wherein the second application is a social media application.

5. The method of claim 1, wherein the second application is a productivity application.

6. The method of claim 1, wherein the second application is a shopping application.

7. The method of claim 1, further comprising:
   identifying, using the mobile application that is stored in the mobile device, a third video feed that is generated by a third application;
   wherein the third video feed comprises a map overlay generated by the third application using location data of the mobile device;
   wherein the single window further includes the third video feed; and
   wherein the second application is a communication application.

8. The method of claim 1, wherein the second application is a streaming application.

9. The method of claim 1, further comprising adjusting a size of the first video feed relative to the second video feed in the single window.

10. The method of claim 1, further comprising adjusting a location of the first video feed relative to the second video feed in the single window.

11. An apparatus adapted to display multiple video feeds in a single window, the apparatus comprising:
    a first camera having a view of a user of the apparatus; and
    a non-transitory computer readable medium having stored thereon a plurality of instructions, wherein the instructions are executed with one or more processors so that the following steps are executed:
      generating a first video feed using the first camera;
      identifying a second video feed that is associated with a second application;
        wherein the second video feed comprises content displayed by the second application; and
        wherein the content displayed by the second application is independent of a location of the mobile device;
      creating, a single window that includes the first video feed and the second video feed;
      displaying, on a user interface, the single window;
      recording, over a period of time, the displayed single window; and
      storing the recording of the displayed single window as a single video file.

12. The apparatus of claim 11,
    wherein the recording of the displayed single window is stored in a memory as the single video file; and
    wherein the instructions are executed with the one or more processors so that the following steps are also executed:
      detecting, after the single video file is stored in the memory, a triggering event; and
      retrieving the single video file from the memory;
      wherein the retrieval of the single video file from the memory is in response to the detection of the triggering event.

13. The apparatus of claim 12,
    wherein the recording of the displayed single window is stored in the memory of a first computer; and
    wherein the instructions are executed with the one or more processors so that the following steps are also executed:
      pushing the single video file from the first computer and to a remote computer that is in communication with the first computer via a network; and
      automatically deleting the single video file from the first computer after pushing the single video file from the first computer and to the remote computer.

14. The apparatus of claim 11, wherein the second application is a social media application.

15. The apparatus of claim 11, wherein the second application is a productivity application.

16. The apparatus of claim 11, wherein the second application is a shopping application.

17. The apparatus of claim 11, wherein the second application is a communication application.

18. The apparatus of claim 11, wherein the second application is a streaming application.

19. The apparatus of claim 11, wherein the instructions are executed with the one or more processors so that the following step is also executed:
   adjusting a size of the first video feed relative to the second video feed in the single window.

20. The apparatus of claim 11, wherein the instructions are executed with the one or more processors so that the following step is also executed:
   adjusting a location of the first video feed relative to the second video feed in the single window.

\* \* \* \* \*